Figure 1:
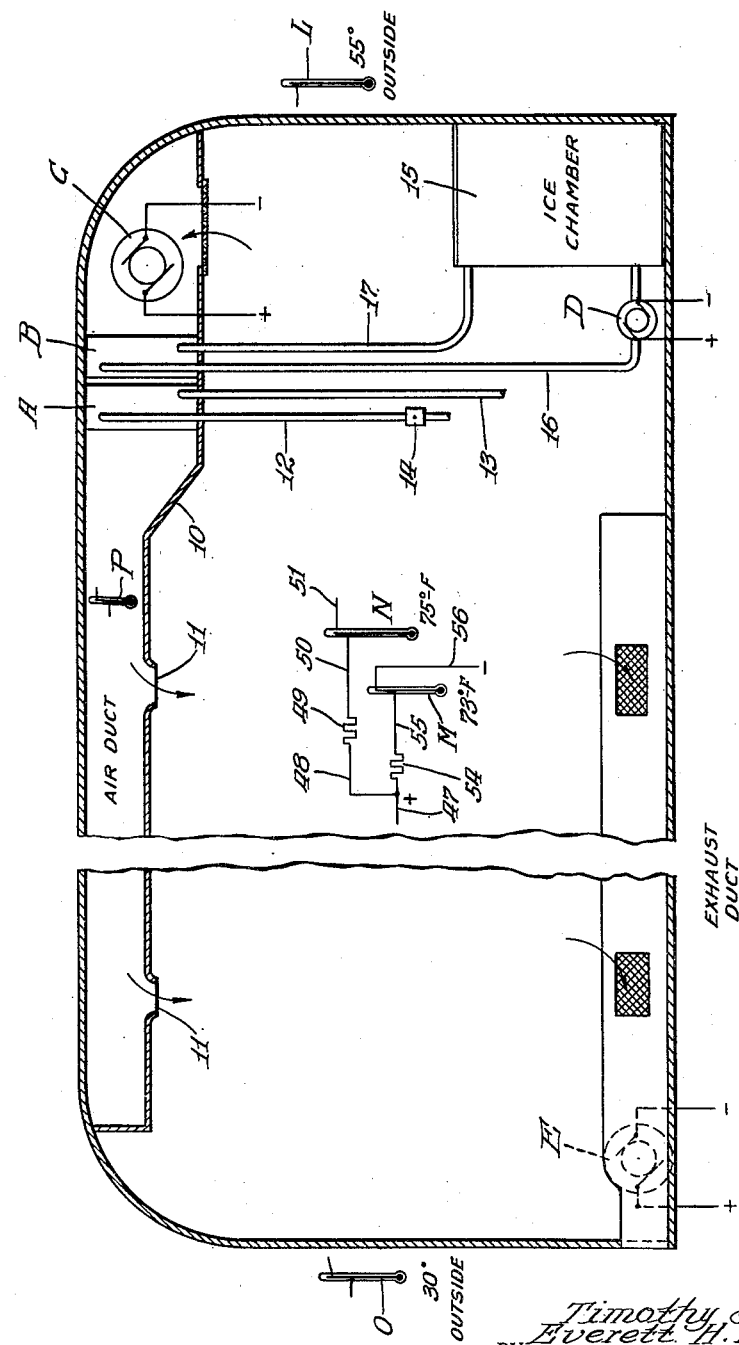

Patented May 15, 1951

2,553,262

UNITED STATES PATENT OFFICE 2,553,262

VENTILATION AND TEMPERATURE CONTROL SYSTEM

Timothy J. Lehane and Everett H. Burgess, Chicago, Ill., assignors, by mesne assignments, to Vapor Heating Corporation, a corporation of Delaware Application November 23, 1946, Serial No. 711,848

6 Claims. (Cl. 236—91)

This invention relates to improvements in ventilation and temperature control systems and particularly to an automatic control of a ventilating and cooling apparatus for maintaining a desired temperature within an enclosed space.

A principal object of the invention is to provide a control means which functions to control the effectiveness of a cooling apparatus in relation to the temperatures which exist both inside and outside of an enclosed space.

The cooling apparatus contemplated by the invention may be any one of the types in which a coolant, either liquid or gas, is circulated through the coils or conduits of a cooler and in which a stream of air is forced over the outer surfaces of the coils or conduits. The cooling apparatus may also be of the type which utilizes a steam jet to produce a cooling action.

The invention includes as one of its principal objects the provision of an improved control means which functions to vary the effectiveness of a cooling apparatus by controlling the volume of the air passed over the coils or conduits of the cooling apparatus and/or by controlling the volume of coolant delivered to or circulated through the coils or conduits of the cooling element.

Another object is to provide temperature responsive means for automatically controlling the volume of air forced through a cooling element and for controlling the volume of air exhausted from an enclosed space in relation to the temperature conditions existing within and outside of the enclosed space whose temperature is being controlled.

A further object is to provide a temperature control of the above character in which a fan for forcing air over the cooling surfaces of a cooling element and a fan for exhausting air from the temperature controlled space are made effective for operation at different speeds by means responsive to predetermined outside temperatures.

The invention briefly described includes an overhead heater A, a cooling element B, a blower C for forcing a stream of air through both elements A and B, a coolant pump D for circulating a coolant fluid through element B, an exhaust fan E, and a plurality of thermostatically controlled relays F, G, H, I, and J for opening and closing various control circuits through the blower C, the pump D, and the exhaust fan E.

The relay F compresses contacts 1 to 6, inclusive, and is controlled by an outside thermostat L which is set to function at a predetermined temperature, for example, 55° F. to make the cooling apparatus available when the inside temperature of the space is such as to require cooling, for example, 73° F.

In order to determine a suitable range for the functioning of the cooling apparatus, an inside thermostat M is set to function at said 73° F. and another inside thermostat N is set to function at a predetermined higher temperature, for example, 75° F. The thermostat N controls the effectiveness of the blower C so that a maximum volume of air will be passed through said cooler B when the space temperature is at or above 75°.

The electrical control circuits for the blower C, pump D, and exhaust fan E are such that when the outside temperature is above a pre-determined point, for example, 55° and the temperature of the enclosed space reaches a predetermined maximum (75°) the blower C and exhaust fan E are operated at full speed and the coolant pump D is operated so as to obtain maximum efficiency of the cooling mechanism.

When the temperature of the enclosed space falls below the temperature setting of thermostat N, the control circuits are altered so as to operate the blower C at slow speed and to simultaneously operate the exhaust fan E at full speed, whereby the effectiveness of the cooling means A is reduced.

Assuming that the temperature of the enclosed space continues to fall to a point below the functional setting of thermostat M while the outside temperature is above a predetermined maximum, for example, the functional setting of thermostat L, the operation of the coolant pump D is interrupted, but the blower C continues operation at said slow speed and the exhaust fan E continues operation at full speed. However, when the outside temperature falls below the functional setting of said thermostat L (55° F.) the control circuits are adjusted to provide maximum ventilation without substantial cooling in that both the blower C and the exhaust fan E are operated at full speeds.

If the outside temperatures continue to fall to a point below the functional setting of thermostat O the control circuits are adjusted so that the blower C is operated at a speed intermediate its slow and full speeds and the exhaust fan E is operated at a corresponding reduced speed.

A thermostat P, responsive to the temperature of the air stream delivered into the space, is so connected in the control circuits that it will function, if the outside temperature is below the functional setting of thermostat L, to interrupt the operation of the blower C and exhaust fan E if the temperature of the air stream being introduced into the space falls below a prescribed temperature, for example, 50° F.

The invention includes, as a further object, the provision of an improved ventilation and temperature control system which will automatically perform the several functions above briefly described.

Figure 2:
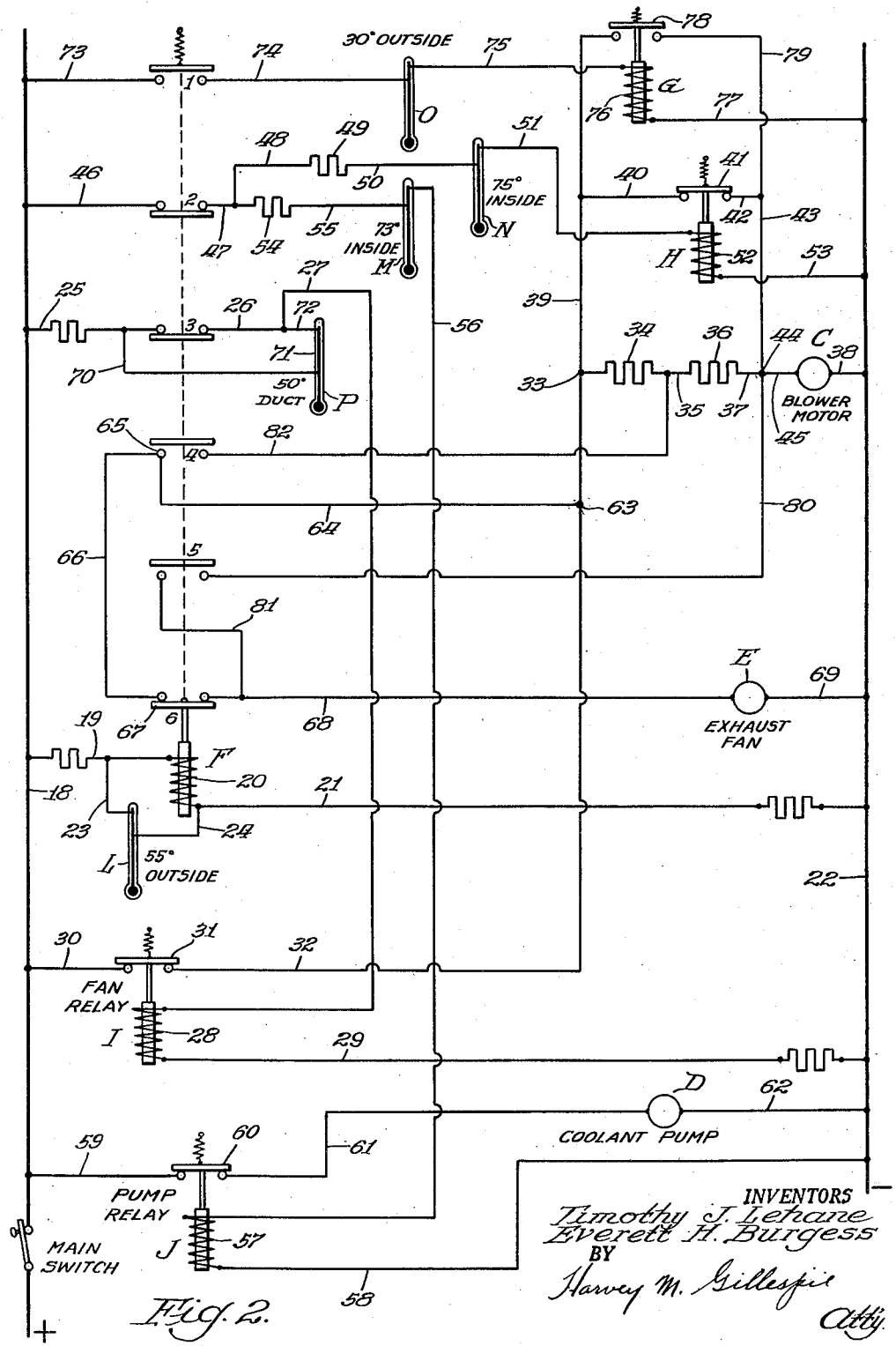

The invention is illustrated in the accompanying drawings wherein:

Fig. 1 is a diagrammatic view of an enclosed space, for example a railway car, equipped with a temperature control apparatus constructed in accordance with this invention, and Fig. 2 is a wiring diagram illustrating the various circuits for controlling the functioning of the operating mechanisms of the cooling apparatus and for controlling the temperatures of the air and the volume circulated through the enclosed space and the volume of air withdrawn from the space.

The invention, as disclosed in the drawings, is designed particularly for controlling the temperature of the air within a railway car, but it is adapted for use in controlling the temperature of any enclosed space.

The heating element A is preferably arranged in a duct 10 which extends along the upper portion of the enclosed space. In the present disclosure the duct extends substantially the full length of the railway car and is provided with outlet openings 11 for delivering the heated or cooled air, as the case may be, into the enclosure whose temperature is being controlled. The heating medium, for example steam, is supplied to the heating element A through a supply conduit 12, the condensation or return steam being discharged through a return pipe 13. Preferably a supply valve 14 is interposed in the steam supply conduit 12, which valve may be operated manually or by any suitable automatic mechanism (not shown).

The cooling element B is positioned in the said duct 10 in a position between the heater A and a blower C so that the blower will force a stream of air through both the cooling element B and the heating element A. Consequently the blower may be used during a heating cycle as well as during the cooling cycle. The cooling element B, as previously indicated, may be of any suitable construction. It is illustrated herein as being of a construction in which iced water is pumped from an ice chamber 15 into the cooling element B. The pump D functions to withdraw the ice water from the ice chamber 15 and delivers it into the cooling element B through a delivery pipe 16. The coolant is returned to the ice chamber through a return pipe 17.

The blower C is adapted to be operated at different speeds, depending upon the temperature conditions both inside and outside the enclosed space. The different operating speeds and the said control elements vary the effectiveness of the cooling element B in relation to the inside and outside temperatures. Preferably, the cooling mechanism is effective to cool the air delivered into the space only when the outside temperature is above the functional setting of thermostat L, since this thermostat controls the relay F through which the blower, fan, and pump operating circuits are connected. When the relay F is energized it closes its contacts 1, 4 and 5 and opens its contacts 2, 3 and 6. The electrical circuit for energizing the relay F, assuming the main switch is closed, leads from the positive line 18 through wire 19, solenoid 20 of relay F, and thence through wire 21 to the negative line 22. When the outside temperature is at or above 55° (the functional setting of thermostat L) the relay F is de-energized, since the thermostat L is connected in a shunt circuit for by-passing the electric current around the solenoid 20. This shunt leads from wire 19 through wire 23 to the upper contact of thermostat L, thence from the lower contact of said thermostat through wire 24 to wire 21.

When the relay F is de-energized, as above indicated, by the rise of the outside temperature to or above 55°, the contact 3 of the relay closes a circuit to energize relay I and thereby electric current to blower C and the exhaust fan E. The circuit for energizing said relay I leads from the positive line 18 through wire 25, closed contact 3 of relay F, wires 26 and 27, through the solenoid coil 28, and thence through wire 29 to the negative line 22. The energization fan relay I closes a circuit through the blower C as follows: From positive line 18 through wire 30, contact 31 of relay I, wire 32 to terminal 33, and thence through resistor 34, wire 35, resistor 36, wire 37, blower motor C, and wire 38 to the negative line 22. This circuit includes both resistors 34 and 36 and therefore starts the operation of the blower motor at slow speed. However, if the temperature of the enclosed space is at a predetermined maximum, for example, 75°, the thermostat N is effective to direct an energizing current to the relay H. The energizing of relay H closes a shunt circuit around the said resistances 34 and 36 so that the blower C will operate at full speed. This full speed circuit leads from terminal 33 in wire 32, through wires 39 and 40, closed contact 41 of relay H, wires 42 and 43 to terminal 44, and thence through wire 45, blower motor C and wire 38 to the negative line 22. The energizing circuit for the said relay H leads from positive line 18 through wire 46, contact 2 of relay F, wires 47 and 48, resistance 49, and wire 50 to the lower contact of thermostat N, thence through wire 51 which leads from the upper contact of thermostat N and through solenoid coil 52 of relay H, and thence through wire 53 to the negative line 22.

Simultaneously with the closings of the above described circuits through the blower C, assuming that the space temperature is at or above 73°, an energizing circuit for the pump relay J is closed through the thermostat M. This circuit leads from the closed contact 2 of relay F through wire 47, resistance 54, wire 55 to the lower contact of said thermostat M, thence through its mercury column and the upper contact to wire 56, solenoid coil 57 of relay J, and thence through wire 58 to the negative line 22. The energization of pump relay J closes a circuit through the coolant pump D leading from positive line 18 through wire 59, close contact 60 of the pump relay J, wire 61, coolant pump D, and wire 62 to the negative line.

In addition to the circuits closed through the blower C and coolant pump D when the relay F is de-energized, a circuit is closed through the exhaust fan E. This fan withdraws air from the enclosed space and thereby stimulates the circulation of cooled air through the space. The energizing circuit for the exhaust fan leads from positive line 18 through wire 30, closed contact 31 of relay I, and wire 32 to terminal 63, thence through wire 64, fixed contact 65 of relay F, wire 66, closed contact 67 of relay F, wire 68, exhaust fan E, and wire 69 to the negative line 22.

It will be observed from the above description of the several circuits that when the temperature of the enclosed space is at or above the functional setting of thermostat N (75°) when the outside temperature is at or above the functional setting of thermostat L (55°), the blower C will operate at full speed, the coolant pump D will operate to circulate a coolant through the cooling element B and the exhaust fan E will operate at full speed to withdraw air from the enclosed space and discharge it into the outer atmosphere.

Assuming now that the temperature of the enclosed space falls below 75°, the mercury column of thermostat N will recede to a position below the upper contact thereof and thereby open the circuit through relay H. The opening of contact 41 of said relay H breaks the full speed circuit through blower C. The electric current then passes from wire 32 and terminal 33 through both resistors 34 and 36 to the blower C and thereby operates the blower at slow speed. The delivery of a reduced volume of air through the cooling element B, reduces its efficiency even though the coolant pump D continues its normal operation. If the temperature of the enclosed space again rises to 75°, so as to close the circuit through the lower and upper contacts of said thermostat N, the blower C is again operated at high speed so as to force a maximum volume of air through the cooling element B and into the enclosed space. However, if the temperature of the enclosed space should fall below 73°, the functional setting of thermostat M, the circuit through the pump relay J will be broken at the thermostat contacts. In such case, the operation of the coolant pump is interrupted and it will remain inoperative as long as the temperature of the space remains below the functional setting of thermostat M. Under this condition the blower will operate at slow speed and the exhaust fan will operate at high speed. However, their combined operations at this time insures proper ventilation of the space when the temperature does not require operation of the cooling element B.

If the outside temperature at any time falls below 55°, the functional setting of thermostat L, the shunt circuit through the thermostat is opened and the electric current passes through the solenoid coil 20 so as to energize the relay F. The energization of said relay, as previously indicated, closes its contacts 1, 4, and 5 and opens its contacts 2, 3, and 6. Under such condition, the opening of contact 2 of relay F makes the thermostats M and N ineffective in the cooling control circuit and, therefore, de-energizes the relay H and the pump relay J. The opening of contact 6 of said relay F de-energizes the exhaust fan E, but another circuit may be established through closed contact 5.

The opening of the contact 3 of said relay F, under certain conditions, will open the energizing circuit through the fan relay I and, therefore, de-energize the blower C. However, if the temperature within duct 10 is above 50°, the circuit through the fan relay I will be maintained. This result is due to the fact that the duct thermostat P is connected in a shunt around the contact 3 of relay F. This shunt circuit leads from wire 25 through wire 70, through the mercury column 71 of the thermostat P, and through wire 72 to wire 27, and thence through the solenoid 28 and wire 29 to the negative line. It will be observed in this connection that the fan relay I will be deenergized so as to interrupt the operation of blower C at any time if the temperature of the duct is below 50°. This arrangement of thermostat P accomplishes two results, to wit: It prevents the introduction of air into the space at too low a temperature for comfort. It also avoids dissipating the heat from the enclosed space, during the heating cycle, if the supply of heating medium to the radiator A is temporarily interrupted.

The closing of contact 1 of relay F when the outside temperature is between 30° and 55°, closes an energizing circuit through relay G. This energizing circuit leads from positive line 18 through wire 73, closed contact 1 of relay F, wire 74, through the lower and upper contacts of thermostat O, wire 75, through solenoid 76 of relay G, and thence through wire 77 to the negative line 22. The circuit energizes the relay G and moves its contact 78 to its closed position, and thereby closes a full speed circuit through blower C. The full speed circuit, thus closed, leads from the positive line 18 through wire 30, closed contact 31 of fan relay I, wire 32, terminal 33, and wire 39 through closed contact 78 of relay G, wires 79 and 43 to terminal 44, thence through wire 45, blower C, and wire 38 to the negative line. The electric circuit for operating the exhaust fan E follows the circuit just described to said terminal 44, and then follows through wire 80, closed contact 5 of relay F, wire 81 to wire 68, and thence through the exhaust fan E, and wire 69 to the negative line. It will be seen, therefore, that when the outside temperature stands between 55° and 30° both the blower C and the exhaust fan E will function at full speed so as to maintain maximum ventilation in the enclosed space. During this period the cooling apparatus B is out of operation, but the heating element A can be made effective, if desired, by opening the valve 14. In such case the high speed operation of the exhaust fan E offsets some of the heating effect.

Assuming now that the temperature outside the space falls below 30°: The relay G will be de-energized by breaking of its circuit at the upper contact of thermostat O. Consequently the electric current is directed through the resistor 36 to both the blower C and the exhaust fan E. Therefore the blower and exhaust fan are operated at an intermediate speed. The operating circuit for effecting the said intermediate speeds leads from the positive line 30 through closed contact 31 of fan relay I, wire 32 to terminal 63, thence through wire 64 to fixed contact 65 of relay F, through closed contact 4 of relay F, and wire 82 to wire 35, thence through resistor 36, wires 37 and 45 to the blower C, and wire 38 to the negative line. The corresponding circuit through fan E leads from the fixed terminal 44 of the previously described circuit, wire 80, closed contact 5 of relay F, wires 81 and 68, to the exhaust fan E, and thence through wire 69 to the negative line.

It will be observed that the invention, as above described, provides a temperature control apparatus in which the blower C may be selectively operated at full speed, low speed or at an intermediate speed. It will also be observed that the exhaust fan E, under certain conditions, will be operated at high and intermediate speeds.

While the invention has been disclosed in connection with the various thermostats which are provided with the functional settings indicated, it will be obvious that the functional settings of the thermostats may be varied without departure from the spirit of the invention.

We claim:

1. A ventilation and temperature control system comprising, in combination, means for forcing a stream of air into an enclosed space including an electrically operated blower selectively operable at a high speed or at a reduced speed, means including a heat exchanger arranged in heat exchange relation with said air stream, a supply pipe for delivering a fluid heat carrier medium to said heat exchanger to alter the temperature of said air stream, an electrically energized device associated with said supply pipe for controlling the delivery of said fluid to said heat exchanger, means including a first relay defining a first electrical circuit for energizing said blower for said high speed operation thereof, means defining an electrical circuit for energizing the first mentioned relay and including a first thermostat interposed therein and set to function at a predetermined space temperature to close said first relay energizing circuit, an impedance branch connected in the first blower energizing circuit and defining a by-pass for directing to the blower, around said first relay when the latter is opened, electric current of less voltage than that delivered by said first energizing circuit for the blower, so as to operate the blower at said reduced speed, means including a second relay defining an energizing circuit for said electrically energized device, an energizing circuit for the second relay comprising a branch conductor leading from a connection in said first relay energizing circuit at the positive side of said first thermostat, and a second thermostat connected in said branch conductor and set to function to close said second relay energizing circuit at a predetermined space temperature which is lower than the temperature setting of the first thermostat.

2. A ventilation and temperature control system comprising, in combination, means for delivering a stream of air into an enclosed space including an electrically operated blower, selectively operable at a high speed or at a reduced speed to vary the volume of air delivered, means including a heat exchanger arranged in heat exchange relation with said air stream, a supply pipe for delivering a fluid heat carrier medium and an electrically energized device associated with said supply pipe for controlling the delivery of said fluid to said heat exchanger to alter the temperature of said air stream, means including an energized closed contact element of a first relay defining a first electrical circuit for energizing said blower for said high speed operation thereof, means defining an electrical circuit for energizing the first mentioned relay and including a first thermostat interposed therein and set to function at a predetermined space temperature to close said first relay energizing circuit, means defining an impedance branch connected in said first blower operating circuit and defining in part a second energizing circuit for the blower, which circuit by-passes the first relay, when the latter is de-energized and directs electrical current of less voltage to the blower than that delivered by its said first energizing circuit so as to operate the blower at said reduced speed, means including a second relay defining an energizing circuit for said electrically energized device, an energizing circuit for the second relay comprising a branch conductor leading from a connection in said first relay energizing circuit at the positive side of said first thermostat, a second thermostat connected in said branch conductor and set to function to close said second relay energizing circuit at a space temperature lower than the temperature setting of the first thermostat, an electrically energized exhaust fan for withdrawing air from the space, means defining an energizing circuit for the exhaust fan including a third relay provided with an energized closed contact element for closing the said fan energizing circuit, and means including a third thermostat set to function at a predetermined temperature of the delivered air for energizing said third relay.

3. A ventilation and temperature control system as defined in claim 2, characterized in that the energized closed contact element of the third relay is connected in series with said energized closed contact of the first relay.

4. A ventilation and temperature control system as defined in claim 2, characterized in that the energized closed contact of the third relay is connected in series with the energized closed contact of the first relay and said impedance branch circuit and is further characterized by the provision of means, including a fourth relay and a de-energized closed contact thereof, defining an alternative path for the third relay energizing circuit, which alternative path by-passes said third thermostat, an energizing circuit for the fourth relay, and a fourth thermostat connected in a by-pass circuit around said fourth relay and set to function at a predetermined outside temperature to de-energize said fourth relay and thereby close said alternative path and to effect energization of said fourth relay at temperatures below said predetermined outside temperature and thereby open said alternative path, whereby the third relay may be energized and de-energized through said fourth relay when the temperature of the delivered air is below the temperature setting of the third thermostat.

5. A ventilation and temperature control system as defined in claim 2, characterized in that the energized closed contact of the third relay is connected in series with the energized closed contact of the first relay and with said impedance branch circuit and is further characterized by the prosion of means, including a fourth relay and a de-energized closed contact thereof, defining an alternative path for the third relay energizing circuit, which alternative path by-passes said third thermostat, an energizing circuit for the fourth relay, a fourth thermostat connected in a by-pass circuit around said fourth relay and set to function at a predetermined outside temperature to de-energize said fourth relay and thereby close said alternative path and to effect energization of said fourth thermostat at temperatures below said predetermined outside temperature and thereby open said alternative path, whereby the third relay, when the temperature of the delivered air is below the temperature setting of the third thermostat, may be energized and de-energized through the closing and opening of said alternative path, a second de-energized closed contact element of said fourth relay interposed in said fan energizing circuit, and means including a pair of energized closed contact elements of said fourth relay defining an alternative energizing circuit for the exhaust fan, which alternative fan energizing circuit by-passes said second de-energized closed contact of said fourth relay and includes a portion of said impedance branch circuit.

6. A ventilation and temperature control system as defined in claim 2, characterized in that the energized closed contact of the third relay is connected in series with the energized closed contact of the first relay and with said impedance branch circuit and is further characterized by the provision of means, including a fourth relay and a de-energized closed contact thereof, defining an alternative path for the third relay energizing circuit, which alternative path by-passes said third thermostat, an energizing circuit for the fourth relay, a fourth thermostat connected in a by-pass circuit around said fourth relay and set to function at a predetermined outside temperature to de-energize said fourth relay and thereby close said alternative path and to effect energization of said fourth thermostat at temperatures below said predetermined outside temperature and thereby open said alternative path, whereby the third relay, when the temperature of the delivered air is below the temperature setting of the third thermostat, may be energized and de-energized through the closing and opening of said alternative path, a second de-energized closed contact element of said fourth relay interposed in said fan energizing circuit, means including a pair of energized closed contact elements of said fourth relay defining an alternative energizing circuit for the exhaust fan, which alternative fan energizing circuit by-passes said second de-energized closed contact of said fourth relay and includes a portion of said impedance branch circuit, means including a fifth relay provided with an energized closed contact connected in series with said energized closed contact of said third relay and defining a third energizing circuit for said blower, which circuit by-passes both the first relay and said impedance branch, the last mentioned circuit being connected and cooperating with a portion of the last mentioned circuit for said exhaust fan to provide a third and non-impeded circuit for said exhaust fan, an energizing circuit for said fifth relay including an energized closed contact of said fourth relay and a fifth thermostat, the latter being set to function at an outside temperature lower than the temperature setting of said fourth thermostat whereby the last two energizing circuits for the blower and the exhaust fan are simultaneously effective when the outside temperature is between the temperatures at which the fourth and fifth thermostats are set to function.

TIMOTHY J. LEHANE.
EVERETT H. BURGESS.

REFERENCES CITED

The following references are of record in the file of this patent:

UNITED STATES PATENTS

| Number | Name | Date |
|---|---|---|
| 2,030,945 | Smith et al. | Feb. 18, 1936 |
| 2,128,096 | Loepsinger | Aug. 23, 1938 |
| 2,182,449 | Parks et al. | Dec. 5, 1939 |
| 2,201,765 | Euwer | May 21, 1940 |